May 9, 1950 D. H. RANSOM 2,506,612

ELECTRONIC COMMUNICATION SYSTEM

Filed Jan. 25, 1946 3 Sheets-Sheet 1

INVENTOR.
DAVID H. RANSOM

BY

R.P. Morris
ATTORNEY

ELECTRONIC COMMUNICATION SYSTEM

Filed Jan. 25, 1946 3 Sheets-Sheet 2

INVENTOR.
DAVID H. RANSOM
BY
R P Morris
ATTORNEY

May 9, 1950 D. H. RANSOM 2,506,612

ELECTRONIC COMMUNICATION SYSTEM

Filed Jan. 25, 1946 3 Sheets-Sheet 3

REGISTERING & LINE SELECTING EQUIPMENT

INVENTOR.
DAVID H. RANSOM
BY
R P Morris
ATTORNEY

Patented May 9, 1950 2,506,612

UNITED STATES PATENT OFFICE 2,506,612

ELECTRONIC COMMUNICATION SYSTEM

David H. Ransom, Montclair, N. J., assignor to Federal Telecommunication Laboratories Inc., New York, N. Y., a corporation of Delaware Application January 25, 1946, Serial No. 643,285

16 Claims. (Cl. 179—18)

Figure 1:
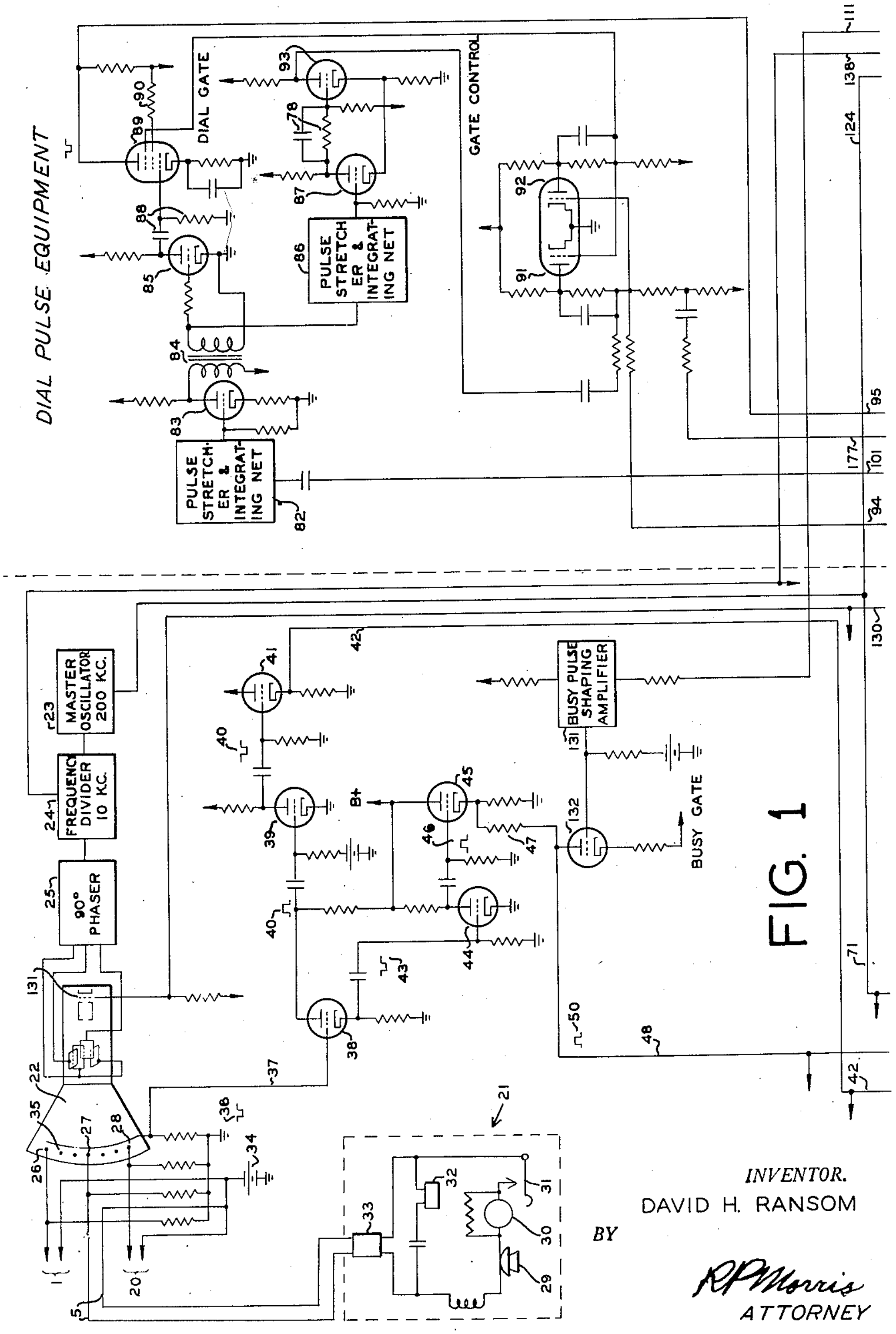

The invention relates to new and useful improvements in communication systems and particularly in telephone systems of the type disclosed in the copending application of E. M. Deloraine, Serial No. 628,613, filed November 14, 1945.

The object of the invention is an intercommunication system in which, through the agency solely of electronic means (vacuum tubes, cathode ray tubes and the like) and without employing any electromechanical devices (relays, step-by-step switches and the like), two-way communication can be established between calling and called lines.

According to the present invention, this object is attained by providing signal (e. g., speech) input and output gate tubes. The input gate is operated under the control of either the calling or the called line to operate the output gate which, in turn, can apply the signals to either the calling or the called line.

Preferably, the input and output gates are pentodes to whose suppressor grid a potential is applied only during time channels when the calling and called lines are connected with the system, to open the gates only during these brief periods.

These and other objects of the invention will more clearly appear from the appended claims and from the detailed description of an embodiment of the invention which is diagrammatically illustrated in the drawings.

Figure 2:
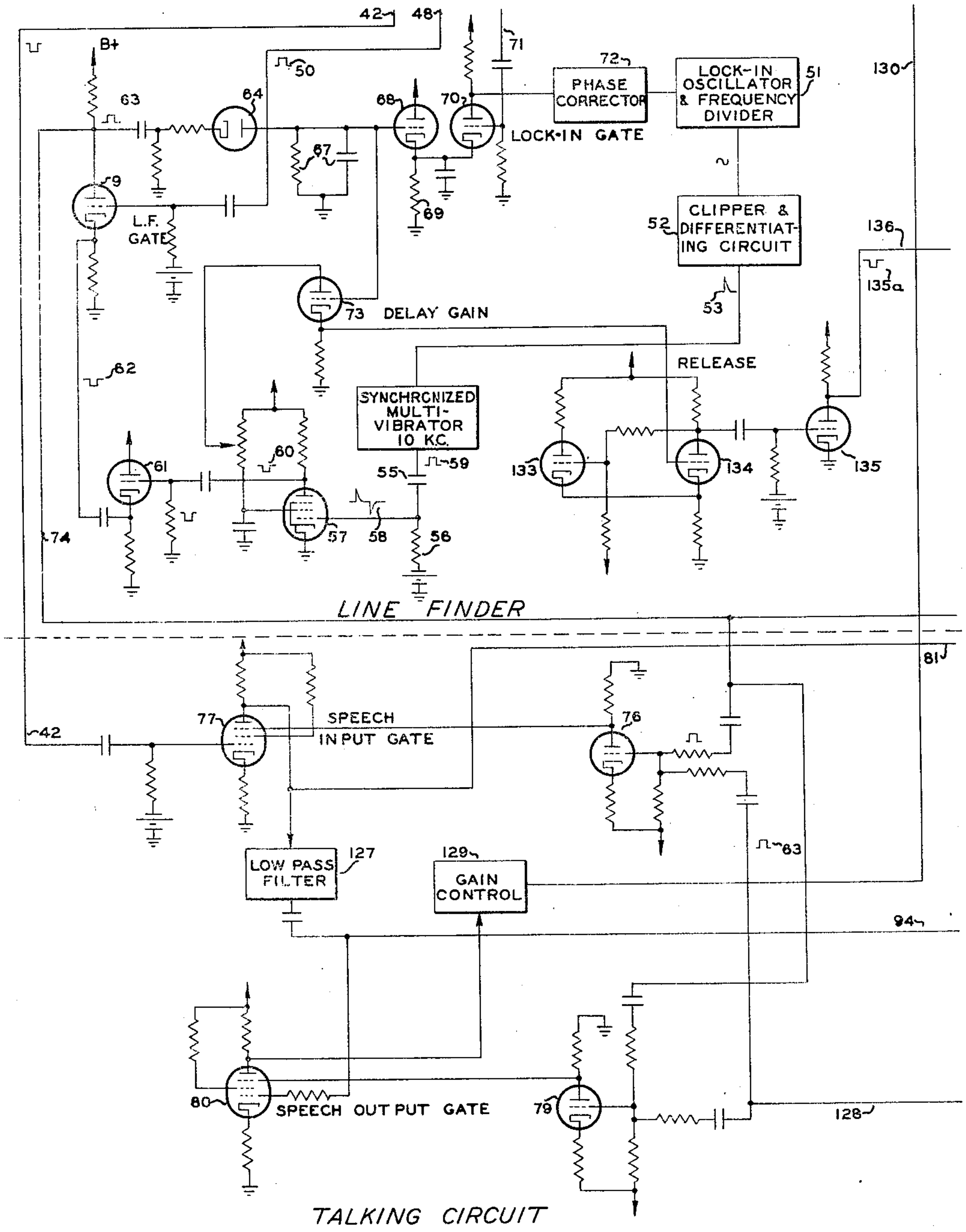
Figure 3:
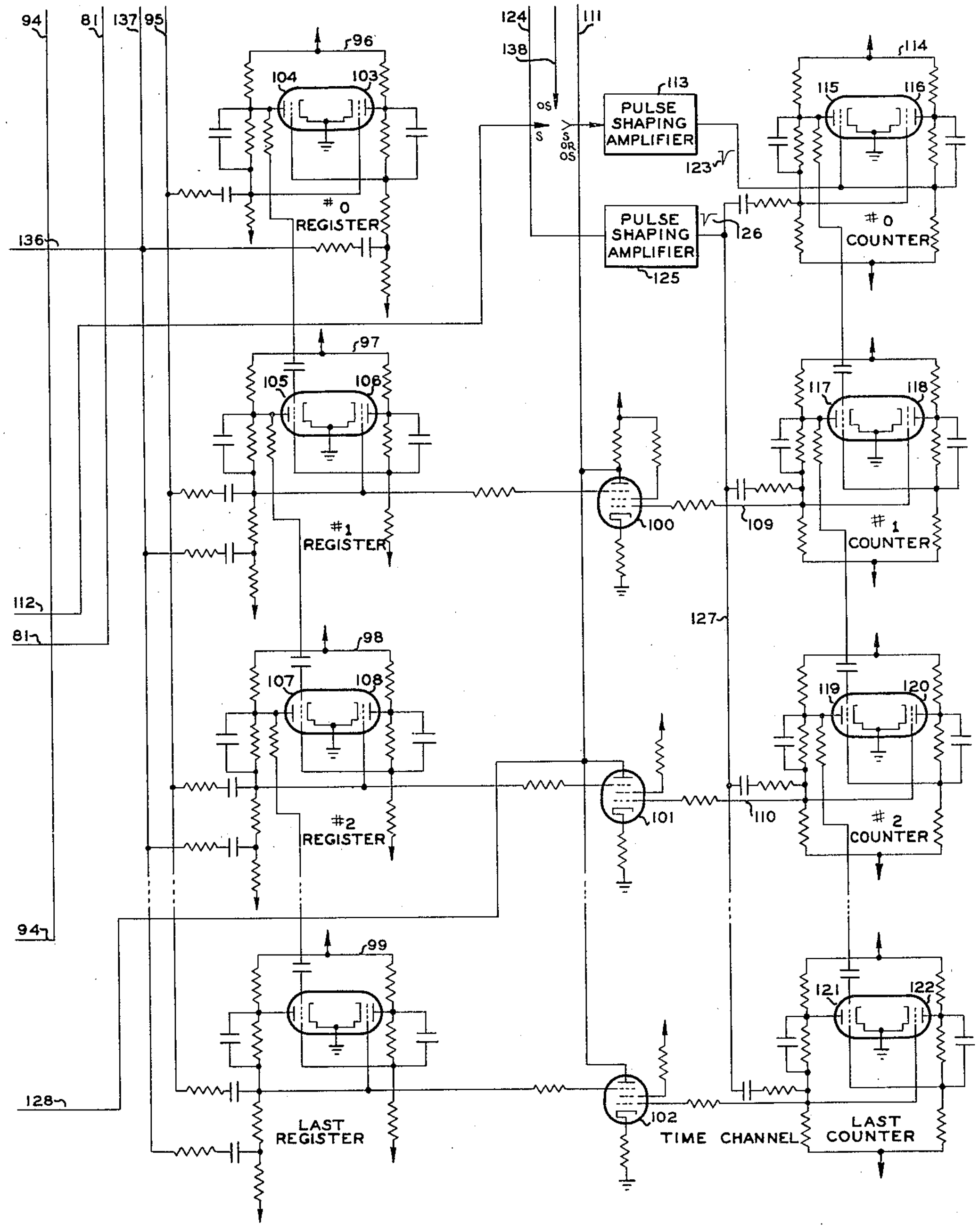

In reading the drawings, Fig. 1 should be placed on top of Figs. 2 and 3, the latter being placed side by side. The upper left-hand corner of Fig. 1 diagrammatically illustrates equipment at subscribers' stations and the balance of the drawings diagrammatically illustrate equipment at a central office. Only so much is shown as is necessary for a clear understanding of the invention.

The telephone system here exemplified comprises a plurality of subscriber's lines, twenty for example, to which are assigned numerals 1 to 20, each of these lines having a substation equipment such as 21, all shown in the left-hand corner of Fig. 1. The other equipment to the left of the dotted line in Fig. 1 is common to all the line circuits. The system further comprises a group of link circuits, one of which is needed for each simultaneous call. Each link circuit has a line finder circuit (above the dotted line of Fig. 2), dial pulse forming circuit (to the right of the dotted line of Fig. 1), talking circuit (below the dotted line of Fig. 2), and registering and line selecting circuit (Fig. 3).

For illustrative purposes, a base frequency of 10,000 cycles per second is assumed as the scanning rate of a cathode ray tube 22 functioning as a rotating distributor to connect the calling with the called line. This frequency is sufficiently high to reproduce voice frequencies with adequate fidelity for speech transmission. The base frequency is derived from a 200-kilocycle stable oscillator 23, preferably crystal controlled, because it is easier to build a stable oscillator at the higher frequencies than in the 10,000-cycle frequency range. The sinusoidal frequency generated in master oscillator 23 is reduced to the base frequency of ten kilocycles in frequency divider 24.

The output of frequency divider 24 is applied over 90° phase shifter 25 to the vertical and horizontal sets of deflecting plates of distributor tube 22. This will serve to rotate the beam of tube 22 at a frequency of 10,000 revolutions per second so that each of the dynodes of the tube will be scanned once every 10,000ths of a second. Incoming lines 1, 5 and 20 are shown connected to dynodes 26, 27 and 28.

At 21 is illustrated a typical subscriber's set (shown connected to line 5) comprising a voice transmitter 29 connected in series with a dial 30 and a normally open switch hook 31. The receiver 32 is bridged permanently across the line, since, for the sake of simplicity, no separate ringing equipment is shown. The signal for summoning a called subscriber may be applied as a special tone which will be reproduced in receiver 32.

Upon initiating a call, the switch 31 is closed, completing a circuit in the calling line loop over low pass filter 33 and the associated lines at the sub-set, applying negative potential from battery 34 to the associated dynode 27. Normally, the dynode electrodes are at the same potential as anode 35 and no current flows. This negative potential will produce a potential difference and cause secondary emission current to flow from the dynodes upon impingement of the beam of tube 22 thereon, producing a negative output pulse 36 in line 37. The pulses are preferably signal modulated to a depth of only 25 to 50 per cent so that there will always be sufficient amplitude to furnish energy for establishing and maintaining connections regardless of modulating signals. The negative pulses resulting from the operation of the selected dynode 27 are fed to the grid of cathode follower and inverter tube 38. The anode circuit of tube 38 is coupled to the grid of clipper tube 39 which serves to clip the pulses 40 at a predetermined level so as to pass only the modulated portions thereof. Thus, the output of this tube, representing the speech signals, may be substantially 100% modulated. The clipped pulses 40 are then applied to a cathode follower tube 41 and from there to all of the link circuits over the output lead 42.

A second output is taken across the cathode resistance of inverter tube 38 and the pulses are applied to a clipper tube 44 which serves to clip the pulses 43 to a constant level, eliminating modulation effects therefrom. This tube is biased to draw current normally so that each negative pulse 43 will drive it beyond cut-off, clipping any variations produced by transmitter modulation or dial pulses. The anode circuit of tube 44 is coupled to the grid of a cathode follower tube 45 which serves to apply pulses 46 through common feed resistor 47 and over wire 48 to the grid of line finder gate tube 49 (Fig. 2) in the first link circuit (now under consideration), and in parallel to the grids of the corresponding line finder gate tubes in all other links.

The pulse 46 after passing through resistor 47 may be designated 50 which arrives at the grid of tube 49 and the other line finder gate tubes. Under the conditions now assumed, when none of the grids of the line finder gate tubes is drawing grid current, pulse 50 is nearly as strong as pulse 46. In the absence of any signals on the cathode of this line finder gate tube 49, the pulse 50 on its grid is insufficient to cause the flow of plate current, because the bias applied to the grid is sufficiently far below cut-off.

The line finder comprises also an oscillator 51 normally operating at a frequency slightly lower than the output frequency from frequency divider 24 in Fig. 1. Oscillator 51 may have, for example, an ouput frequency of 50 kc. which is applied as rectangular selecting pulses 53 through a clipper amplifier and differentiating circuit 52 to a multi-vibrator 54 arranged to synchronize at 10 kc.

The output of multi-vibrator 54 is applied through a differentiating net 55 and 56 to the control grid of clipper tube 57 in the form of pulses 58. Tube 57 is normally biased beyond cut-off but the leading edge of each square wave output 59 from multi-vibrator 54 is of sufficient strength to drive the grid positive on a portion of the square wave. The trailing edge of pulse 59 is suppressed. A negative pulse 60 of approximately five microseconds is produced in the plate circuit of tube 57. A cathode follower tube 61 passes the negative signal or control pulse 62 to the cathode of line finder gate tube 49. The frequency of the line finder lock-in oscillator 51 being slightly less than that of the master oscillator 23, the pulses 50 and 62 will drift in time. When the signal 50 on the grid of tube 49 coincides with the selecting pulse 62, then the tube 49 conducts and passes a pulse 63 to diode 64, over wire 65 and over wires 66 and 112 to the line selecting circuit.

The pulse 63 is rectified in tube 64 and fed to an integrating network 67. The negative potential from the integrator is amplified in tube 68, reducing the potential in cathode resistor 69 which is common to tubes 68 and 70. The reduction of this potential renders tube 68 conductive, and tube 70 will now commence to pass the sine wave from master oscillator 23, which is continuously applied to the grid thereof over line 71. This amplified wave is then passed through phase corrector circuit 72 serving to lock-in oscillator 51 with the master oscillator 23.

A portion of the rectified output of diode 64 is fed to a control grid of delay gain control tube 73. Operation of tube 73 increases the positive voltage on the screen of clipper tube 57 increasing the amplitude of the output pulses 60 and hence 62. The value of resistor 47 and the grid current characteristics of line finder gate tube 49 are such that the total positive swing of its grid with respect to its cathode cannot exceed a predetermined small amplitude regardless of the magnitudes of pulses 50 and 62 which are applied, respectively, to the cathode and via resistor 47 to the grid of tube 49. However, the square pulses 62 from tube 61 will increase in amplitude with the change in bias of tube 57. Thus, since the sum of pulses 50 and 62 is roughly constant, while the value of the component 62 is rising, the magnitude of pulses 50 must be correspondingly decreasing. This decrease in amplitude of pulse 50 is effective to prevent other line finder gate tubes (similar to 49 but in other links) from responding.

The decrease in pulse 50 does not, however, reduce the response of tube 49 in the first link (now under consideration) since the total input between grid and cathode is not decreased. Thus, pulses 63 of roughly constant amplitude are applied over line 74 to gate control tube 76 which serves to control the suppressor bias on the input gate tube 77, and in multiple to the grid of control tube 79 of output gate tube 80.

The speech input gate tube 77 is normally conditioned by suppressor grid bias so that the pulses applied thereto from the output of cathode follower 41 over line 42 will not be passed. However, upon operation of tube 76, by selection of a predetermined incoming line as described above, the potential on the suppressor grid of tube 77 will make the tube conductive during instants corresponding to a certain time channel. Combined dial-and-speech pulses will, therefore, be sent from the output of tube 77 over line 81 (Figs. 3 and 1) to the pulse stretcher 82.

The line finder having now operated, the pulses corresponding to the time channel individual to the calling line thus applied to pulse stretcher and integrating network 82 are amplified in tube 83 and applied over transformer 84 to the control grid of clipper tube 85 and over a second pulse stretcher and integrating net 86 to the control grid of a tube 87. The integrating network 82 in the input circuit of tube 83 functions as a low-pass filter which will pass the dial pulses but will not pass the higher frequency communication signals. The clipper 85 serves to shape and clip the incoming dial pulses to form square wave pulses which in turn are differentiated in network 88 and applied to the control grid of dial gate tube 89. Tube 89 is biased so as to suppress the negative part of the differentiated pulse, corresponding to the leading edge of the square dial pulse, and to pass to the register circuit only the positive part of the differentiated pulse, corresponding to the trailing edge of such square wave pulse.

Dial gate tube 89 is normally biased to conduction by the voltage on its suppressor from the dial gate control tubes 91, 92 (with tube 91 normally conducting). Tube 87 cuts off at the beginning of a series of dial pulses (sending out an ineffective positive pulse) and re-operates at the end, sending out, through 93, a negative pulse to the dial gate control 91, 92. The negative pulse from tube 93 cuts off tube 91 causing tube 92 to conduct. This biases tube 89 to cut-off, locking out the dial gate so that transients and voice modulations, or even additional dialing will not disturb the registers. At the same time, a control voltage is sent out over lead 94 biasing the control grid of the output gate 80 (Fig. 2) for conduction.

In other words, the leading edge of the first pulse in the output circuit of the pulse stretcher and integrating net 86 will cause the flip-flop circuit comprising tubes 87 and 93 to transfer conduction from 93 to 87. This condition will be maintained throughout the series of pulses on the grid of 93 by the potential build-up in the low pass filter 78. At the end of the series, 93 will again resume conduction, sending a negative pulse to the gate control tubes 91 and 92. Normally, 91 is conducting, biasing the suppressor grid of the dial gate tube 89 to pass signals, and the control grid of the output gate tube 80 to cut-off. The negative pulse at the end of a series of pulses transfers conduction from 91 to 92, and closes the dial gate 89 so that transients will not change the register settings. The output gate 80 will be opened to permit the passage of the signals.

The output line 95 of the dial gate tube 89 is coupled to a plurality of trigger circuits 96, 97, 98 and 99. As many of these trigger circuits are provided as there are subscriber's lines. Normally, the right-hand tubes of each pair (except for the preliminary circuit 96) are cut off, biasing the respective time channel gate tubes 100, 101 and 102 to cut-off on their associated suppressor grids. When a series of dial pulses has been received, one of the right-hand tubes of the register will be left conducting, permitting its gate tube to pass the signal.

The first trigger circuit 96 has no associated gate, and tube 103 is normally conducting. A first pulse over wire 95 from the pulse forming circuit cuts off tube 103 of trigger circuit 96, causing tube 104 to conduct. A negative pulse is now sent from the plate circuit of 104 to the grid of the normally conducting tube 105 of trigger circuit 97, cutting off this tube and causing tube 106 to conduct. This operation of tube 106 serves to open the first gate tube 100.

The second negative pulse from the pulse forming circuit cuts off tube 106 transferring conduction to tube 105. A negative pulse from the plate of tube 105 cuts off tube 107 restoring gate 100 to blocked condition which transfers conduction to tube 108 in the #2 register. The conduction of tube 108 unblocks the second gate tube 101.

This cycle is repeated in succeeding registers until the last dial pulse has been sent.

Thus, at the end of dialing only the gate corresponding to the number of dial pulses is left unblocked. Assuming that line 3 is calling line 5, the second gate 101 will be unblocked. Pulses which may arrive on the grids of the gate tubes (e. g. over lines 109, 110, etc.) will be passed only by gate 101 to the common output wire 111.

The dial of each line is set so that a number of pulses corresponding to the difference between the calling line and the called line will be transmitted. It thus becomes necessary to produce time displacements in the communication energy corresponding to the difference in timing between the scanning of the two lines in the cathode ray scanning device 22. The different signaling pulses operate through the pulse register circuit, as described above, to select the desired time displacement in accordance with the called line.

Instead of producing a true transmission delay in the signals from the calling line, these are stored and then later released. To determine the proper instant for releasing the stored signals, the equipment counts the pulses which mark the time channels intervening between the calling and called line channels.

In order to start the counting at the instant corresponding to the calling line's time channel, a synchronizing pulse from the line finder gate tube 49 over line 66 and line 112 is passed through the pulse shaping amplifier 113 to the synchronizing counter 114. We note that 113 is connected only to line 81 and not to line 138.

Normally the left-hand tubes 115, 117, 119 and 121 of all the counters are conducting. The synchronizing pulse 123 applied to the grid of 115 flips conduction in the 0 counter from tube 115 to tube 116.

Negative impulses are sent at 5 $\mu s$ intervals from the master oscillator 23 over conductor 124 and the shaping amplifier 125, and are applied as pulses 126 to the grids of all the right-hand tubes 116, 118, 120 and 122 in the counters over the common lead 127. The pulse 126 following the synchronizing pulse 123 will transfer conduction in the 0 counter 114 from tube 116 to tube 115. A negative pulse is then sent from the plate of 115 to the grid of 117 in the #1 counter, flipping conduction to tube 118.

Each successive pulse will flip a counter so that the right-hand tube is conducting, until all the counters are operated.

In addition to the 0 counter, only three counters are shown in Fig. 3 corresponding to the three time channel gate tubes 100, 101 and 102. These counters and gate tubes cooperate to control the instant of release of speech energy to the called line. As the counters operate successively, they apply potentials to wires 109, 110, etc. But, if only gate 101 is open, only the potential on wire 110 will pass to common wire 111, thus properly timing the release of speech signals to the called line as will shortly appear.

The incoming energy from the speech input gate tube 77 is applied by means of a low pass filter and audio amplifier 127 which serves as a storage means for the incoming speech signals. These speech signals from the output of filter 127 are continuously applied to the control grid of speech output gate tube 80. However, no energy can pass until the completion of dialing when the cut-off bias is removed from control grid of gate tube 80 by the gate control 91, 92, and until such time as the proper gate pulses are applied from wire 111 over wire 128 to cut-off gate control tubes 76 and 79, which in turn remove the bias on the suppressor grids of tubes 77 and 80. The bias will be removed at the proper time depending upon the time channel gate 100—102 which happens to be open.

If, for example, the #1 register is conducting on its right-hand tube 106, then the positive bias on it is transferred to the suppressor grid of the time channel gate tube 100 so that when the #1 counter flips conduction to the right-hand tube 118, a negative signal will be generated on the plate of 100 and passed over wires 111 and 128 to the gate control tubes 76 and 79.

The following circuit is now ready to pass the speech signal: from the dynode 27 of line 5 (Fig. 1) to the cathode follower and inverter 38, clipper tube 39, cathode follower tube 41, conductor 42, to the control grid of the input gate tube 77 (Fig. 2). It will be remembered that the input gate tube 77 is opened by a pulse from the plate of the line finder gate 49 via control tube 76 whereby only the pulse initiated by the calling line is permitted to pass.

The signal from the plate of input gate 77 is fed to the low pass filter 127 where it is converted to the original speech signal and passed onto the control grid of the speech output gate 80. This gate is opened by the signal from the line selector circuit (Fig. 3) sent by the time channel gate 100 over conductor 128 and corresponding to the time period of the called line. A modulated pulse may thus be transmitted from the plate of output gate 80 through gain control 129, conductor 130, to the grid 131 of the distributing tube 22. At the instant when the beam sweeps the called line, the signal is passed through the low pass filter (corresponding to 33) to the subset of the called line. The calling subscriber signals at voice frequency.

When the call is answered, speech in the opposite direction passes through exactly the same path, the only difference being that now the timing of the input gate 77 is under the control of the line selecting circuit (conductor 128 being multipled to the grids of both gate control tubes 76 and 79), and the output gate 80 is under the control of the line finder circuit (conductor 74 being also multipled to the grids of both gate control tubes 76 and 79). Since there is a feedback path in this circuit to each line terminal, the total gain around the system must always be less than unity. This is accomplished by the gain control equipment 129.

In order to protect the called line from selection by a link when the receiver is removed at the called station to answer the call, the pulse from the time channel gate tube 100, 101 or 102 that happens to be operated is fed over conductor 111 and a pulse-shaping amplifier 131 to the grid of a busy gate tube 132. This will produce a negative pulse on conductor 48 which will neutralize the line pulse 50 that would otherwise be produced on this conductor by the initiation of a call. A line finder gate corresponding to 49 cannot, therefore, be operated.

When the calling subscriber hangs up at the end of the conversation, the various circuits are released under the control of the delay gain tube 73 (Fig. 2). The register and dial gates which are locked-in are released by the release tubes 133, 134 and 135 in the following manner:

When the call is initiated, the delay gain tube 73 is driven to cut-off, thus lowering the potential on the grid of tube 134 connected with the cathode of tube 73. This causes the conventional flip-flop circuit shown to transfer conduction to tube 133 whereupon a negative pulse is sent to the grid of tube 135. Tube 135 is biased beyond cut-off and the application of a negative pulse to its grid has no effect.

When the line finder releases, tube 134 again becomes conductive and causes the sending of a positive pulse to the grid of 135. This positive pulse will be transmitted as a negative pulse 135*a* over conductor 136 which is multipled to all the registers and causes their restoration to normal. Conductor 137 through which conductor 136 is multipled to the various registers transmits the signal to the gate control tubes 91 and 92 and restores them to normal.

The circuit is now in condition for the next call.

The delay count may be started from a fixed reference instead of from the line finder pulse. This permits the installation of the same dials at all the stations and the arrangement of the central office equipment for multi-digit operation. For this purpose, the zero terminal 26 of the distributor 22 is made inoperative and the pulse shaping amplifier 113 (Fig. 3) is disconnected from conductor 81 and connected with conductor 138 and, thus, with the frequency divider 24 of Fig. 1.

Otherwise the circuits are left unchanged but the assigned number will be dialed, and the time count will start from the zero time channel instead of the line finder pulse.

What I claim is:

1. In a communication system, a plurality of lines, an electronic means common to said lines and having a plurality of electrodes in which the lines terminate, a control grid, means for cyclically sweeping with an electron beam the electrodes, a signal repeater comprising a discharge tube having input and output circuits, means for effectively associating the input circuit with the electrodes of the calling and called lines when they are swept by the beam, means for effectively associating the output circuit with the control grid when the beam sweeps the electrodes of the calling and called line, and timing means for applying to the repeater signals originating on calling and called lines when the beam of said electronic means sweeps over their terminals.

2. In a communication system, a plurality of lines, an electronic means common to said lines and having a plurality of electrodes in which the lines terminate, a control grid and means for cyclically sweeping the electrodes with an electron beam, a plurality of signal repeaters each having an output connected with said control grid means operative upon the initiating of a call for taking into use one of said repeaters, timing means for applying to the repeater signals originating on calling and called lines when the beam of said electronic means sweeps over their terminals and means for releasing the repeater taken into use by the termination of the call.

3. In a communication system, a plurality of lines, electronic means having means for moving a beam of electrons, a control grid for the beam and a plurality of electrodes in which said lines terminate, means for operating said electronic means continuously and cyclically to sweep said terminals with its beam, a plurality of signal input and signal output tubes provided in pairs, means operative upon the initiation of a call on a line for selecting a pair of tubes, input, output and control circuits for the selected tubes, means for operating the control circuits to render the selected pair effective when the beam sweeps the electrodes in which the calling and called lines terminate and ineffective at all other times, a connection from the output of the input tube to the input of the output tube, means for associating the input of the input tube with the electrodes in which the calling and called lines terminate when they are swept by the beam, and means for connecting the output of the output tube with the control grid when the electrodes of the calling and called lines are swept by the beam.

4. The system according to claim 3, and in which the input and output tubes have cathodes, anodes, control grids and suppressor grids.

5. The system according to claim 3, and in which the input and output tubes are pentodes.

6. The system according to claim 3, in which the means for selecting a pair of tubes comprises a normally inactive line finder gate tube, means for actuating said line finder gate tube upon the initiation of a call, and means for operating the last-mentioned tube to convey signals from the calling and called lines to the signal input tube whenever the electron beam sweeps over the terminating electrodes thereof.

7. The system according to claim 3, and a low pass filter in the output circuit of the input tube.

8. The system according to claim 3, and means in the output circuit of the output tube to keep the total gain around the system at less than unity.

9. A system for interconnecting two channels of different time displacement for two-way energy transfer between said channels, comprising a first means for receiving energy from either channel, a second means for applying energy to either channel, means for transferring energy from said first to the second means, selectively operable means common to said channels for producing a time displacement of the energy received from one channel equal to the difference in time displacement between said channels, line finder means common to said channels and responsive to energy received from a channel, and means jointly controlled by said line finder and selectively-operable means for operating said first means under the alternate control of both channels.

10. The system according to claim 9, and in which said first and second means are normally ineffective vacuum tubes, and means jointly controlled by the line finder and selectively operable means for alternately rendering said tubes effective.

11. A system for interconnecting two channels of different time displacement for two-way energy transfer between said channels, comprising a first means for receiving energy from either channel, a second means for applying energy to either channel, means for transferring energy from said first to the second means, selectively operable means common to said channels for producing a time displacement of the energy received from one channel equal to the difference in time displacement between said channels, line finder means common to said channels and responsive to energy received from a channel, means controlled over one channel for operating the first means by said line finder and the second means by the selectively operable means, and means controlled over the other channel for operating said first means by the selectively operable means and the second means by the line finder means.

12. A system for interconnecting two channels according to claim 11, and in which said first and second means are vacuum tubes having cathodes, anodes, control grids and suppressor grids.

13. A telephone system for interconnecting calling with called channels of different time displacement for two-way speech over said channels, comprising a speech input tube for receiving energy from the calling and called channel, a speech output tube for applying energy to the calling and called channel, a connection for operating the output tube in accordance with the operation of the input tube, selectively operable means common to said channels for producing a time displacement of the energy received from one channel equal to the difference in time displacement between said calling and called channels, line finder means common to said channels and responsive to energy received from a channel, and means jointly controlled by said line finder and selectively operable means for alternately rendering effective said input and output means.

14. In a telephone exchange system, a cathode ray tube having a control grid and a plurality of electrodes adapted for successive engagement by the beam, a telephone line connected with each electrode, a speech input and a speech output gate tube, a connection for operating the control grid of the cathode ray tube by the output gate tube, a connection for controlling the operation of the input gate tube through the electrodes of the calling and the called line, cut-off control means for the input and the output gate tubes, means controlled by energy applied to the electrodes for controlling said cut-off control means, means controlled by the input gate for variably operating the output gate tube in accordance with speech signals, a line selecting circuit variably operable in accordance with the designation of the called line, and means operable upon the actuation of the line selecting circuit for controlling the operation of the cut-off control means.

15. In a telephone exchange system, a cathode ray tube having a control grid and a plurality of electrodes adapted for successive engagement by the beam, a telephone line connected with each electrode, a speech input and a speech output gate tube each having a cathode, an anode, a control grid and a suppressor grid, a connection from the control grid of the cathode ray tube to the anode of the output gate tube, a connection for applying potentials to the control grid of the input gate tube through the electrodes of the calling and the called line, two triodes, one for applying potentials to the suppressor grid of the input and the other for applying potentials to the suppressor grid of the output gate tube, a line finder gate tube controlled by energy applied to the electrodes, a multiple connection from the output of the line finder gate tube to the grids of said triodes, a connection from the plate of the input to the control grid of the output gate tube, a low pass filter in the last-mentioned connection, a line selecting circuit variably operable in accordance with the designation of the called line, and means operable upon the actuation of the line selecting circuit for applying a potential to the multiple connection to the grids of the triodes.

16. In a telephone exchange system, a cathode ray tube having a control grid and a plurality of dynodes, means for continuously rotating the beam of said tube successively to engage said dynodes, a telephone line connected with each dynode, a speech input and a speech output gate tube each having a cathode, an anode, a control grid and a suppressor grid, a connection from the control grid of the cathode ray tube to the anode of the output gate tube, gain control means in said connection to keep the total gain around the system at less than unity, a connection for applying potentials to the control grid of the input gate tube through the dynodes of the calling and the called line, two triodes, one for applying potentials to the suppressor grid of the input and the other for applying potentials to the suppressor grid of the output gate tube, a line finder gate tube controlled by energy applied to the dynodes, a multiple connection from the output of the line finder gate tube to the grids of said triodes, a connection from the plate of the input to the control grid of the output gate tube, a low pass filter in the last-mentioned connection, a line selecting circuit comprising register and counter tubes variably operable in accordance with the designation of the called line, time channel gate tubes controlled by the counters, and means operable upon the actuation of any time channel gate tube for applying a potential to the multiple connection to the grids of the triodes.

DAVID H. RANSOM.

REFERENCES CITED

The following references are of record in the file of this patent:

UNITED STATES PATENTS

| Number | Name | Date |
|---|---|---|
| 2,057,773 | Finch | Oct. 20, 1936 |
| 2,185,693 | Mertz | Jan. 2, 1940 |
| 2,263,369 | Skillman | Nov. 18, 1941 |
| 2,265,216 | Wolf | Dec. 9, 1941 |
| 2,277,192 | Wilson | Mar. 24, 1942 |
| 2,387,018 | Hartley | Oct. 16, 1945 |
| 2,406,165 | Schroeder | Aug. 20, 1946 |